(12) United States Patent
Kondapally

(10) Patent No.: US 12,552,037 B2
(45) Date of Patent: Feb. 17, 2026

(54) REMOTE CONTROL SYSTEM

(71) Applicant: Honda Motor Co., Ltd., Tokyo (JP)

(72) Inventor: Anirudh Reddy Kondapally, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 18/153,351

(22) Filed: Jan. 12, 2023

(65) Prior Publication Data

US 2023/0286159 A1 Sep. 14, 2023

(30) Foreign Application Priority Data

Mar. 8, 2022 (JP) ................................. 2022-035669

(51) Int. Cl.
*B25J 9/16* (2006.01)
*B25J 13/00* (2006.01)
*B25J 13/02* (2006.01)

(52) U.S. Cl.
CPC ............. *B25J 9/1689* (2013.01); *B25J 9/163* (2013.01); *B25J 13/02* (2013.01)

(58) Field of Classification Search
CPC . B25J 9/1689; B25J 9/163; B25J 13/02; B25J 13/00; B25J 9/00; B25J 9/16; B25J 3/00; B25J 9/0081; B25J 9/1612; B25J 9/1661; B25J 9/1669; B25J 13/08; G05B 2219/40131; G05B 2219/35464; A61B 2019/2273; A61B 2034/741
See application file for complete search history.

(56) References Cited

U.S. PATENT DOCUMENTS

| | | | | |
|---|---|---|---|---|
| 9,199,376 | B2* | 12/2015 | Wells | B25J 9/1612 |
| 9,381,645 | B1* | 7/2016 | Yarlagadda | B65G 1/1378 |
| 2011/0118752 | A1* | 5/2011 | Itkowitz | B25J 9/1689 |
| | | | | 345/157 |
| 2013/0173055 | A1* | 7/2013 | Kim | B25J 3/04 |
| | | | | 700/245 |
| 2016/0303737 | A1* | 10/2016 | Rossano | B25J 9/1656 |
| 2022/0032454 | A1* | 2/2022 | Yang | B25J 9/1612 |

(Continued)

FOREIGN PATENT DOCUMENTS

| | | |
|---|---|---|
| JP | 6476358 | 2/2019 |
| WO | 2021176861 | 9/2021 |

OTHER PUBLICATIONS

Cotugno et al., "The Role of the Thumb: Study of Finger Motion in Grasping and Reachability Space in Human and Robotic Hands," Apr. 5, 2016 (Year: 2016).*

(Continued)

*Primary Examiner* — Adam R Mott
*Assistant Examiner* — Byron Xavier Kasper
(74) *Attorney, Agent, or Firm* — JCIPRNET

(57) ABSTRACT

A remote control system, in which an operator remotely operates a robot having an end effector that is capable of gripping and manipulating an object, includes an acquisition part acquiring information on a state of the operator operating the robot; an end effector capable of performing multiple types of gripping methods; a gripping method table in which the gripping methods are stored; and a gripping method selector selecting the gripping method from the gripping method table based on a joint flexion angle of the operator obtained from operator information of the acquisition part.

2 Claims, 7 Drawing Sheets

(56) References Cited

U.S. PATENT DOCUMENTS

2022/0096187 A1*  3/2022  Xu .................... A61B 34/76
2022/0288781 A1*  9/2022  Schoessler ............ B25J 9/1651
2023/0341936 A1* 10/2023  Inoue .................. G06F 3/0325

OTHER PUBLICATIONS

"Notice of Reasons for Refusal of Japan Counterpart Application", issued on Aug. 26, 2025, with English translation thereof, p. 1-p. 7.

* cited by examiner

REMOTE CONTROL SYSTEM

CROSS-REFERENCE TO RELATED APPLICATION

This application claims the priority benefits of Japanese application no. 2022-035669, filed on Mar. 8, 2022. The entirety of the above-mentioned patent application is hereby incorporated by reference herein and made a part of this specification.

BACKGROUND

Technical Field

The disclosure relates to a remote control system.

Description of Related Art

A control device has been proposed that allows a user to assist the operation of a robot. As such a control device, for example, a control device has been proposed, which includes a first information acquisition part that acquires first user posture information indicating the posture of a first user who operates a robot; a second information acquisition part that acquires pre-change posture information indicating a pre-change posture, which is the posture of the robot before the posture of the robot is changed based on the first user posture information; and a determination part that determines a target posture different from the posture of the first user as the posture of the robot based on the pre-change posture and the first user posture information acquired by the first information acquisition part when the robot takes the pre-change posture indicated by the pre-change posture information (see Patent Literature 1: Japanese Patent No. 6476358).

However, according to the related art, it was difficult to grasp the movement of a human hand despite the attempt to reflect the movement of the operator's hand.

SUMMARY

A remote control system according to one aspect of the disclosure is a remote control system in which an operator remotely operates a robot having an end effector that is capable of gripping and manipulating an object. The remote control system includes: an acquisition part acquiring information on a state of the operator operating the robot; an end effector capable of performing multiple types of gripping methods; a gripping method table in which the gripping methods are stored; and a gripping method selector selecting the gripping method from the gripping method table based on a joint flexion angle of the operator obtained from operator information of the acquisition part.

A remote control system according to one aspect of the disclosure is a remote control system in which an operator remotely operates a robot having an end effector that is capable of gripping and manipulating an object. The remote control system includes: an acquisition part acquiring information on a state of the operator operating the robot; an end effector capable of performing multiple types of gripping methods; a gripping method table in which the gripping methods are stored; an intention estimation part estimating an intention of the operator by comparing a distance between a fingertip of a thumb and a fingertip of another finger of the operator with a size of a target object; and a gripping method selector selecting the gripping method from the gripping method table based on the intention of the operator estimated.

DESCRIPTION OF THE EMBODIMENTS

Figure 1:
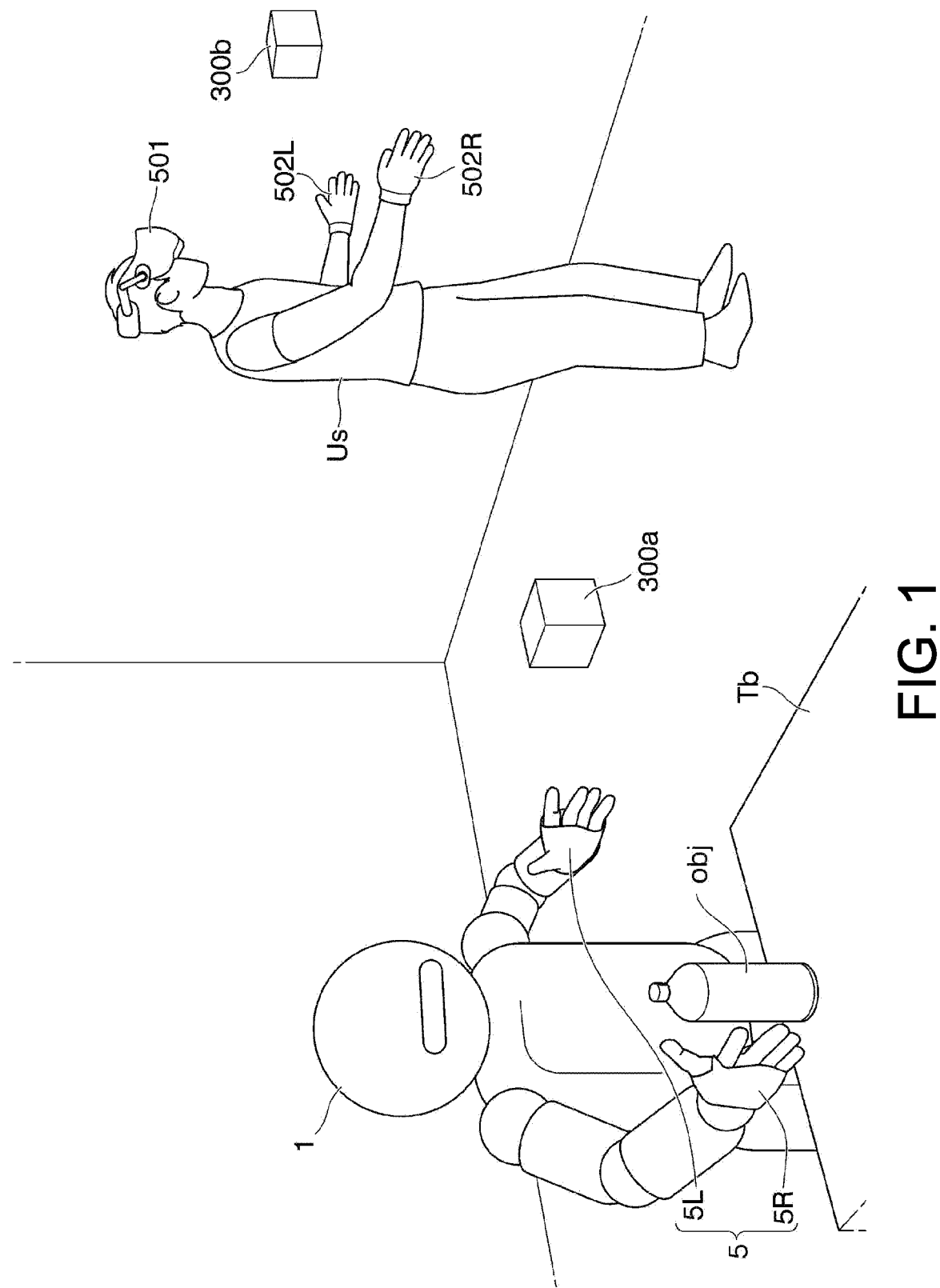
FIG. 1 is a diagram for illustrating an overview of the remote control system and an overview of the work according to an embodiment.

In view of the above, the disclosure provides a remote control system that is capable of reflecting the movement of the operator's hand.

(1) In order to achieve the above, a remote control system according to one aspect of the disclosure is a remote control system in which an operator remotely operates a robot having an end effector that is capable of gripping and manipulating an object. The remote control system includes: an acquisition part acquiring information on a state of the operator operating the robot; an end effector capable of performing multiple types of gripping methods; a gripping method table in which the gripping methods are stored; and a gripping method selector selecting the gripping method from the gripping method table based on a joint flexion angle of the operator obtained from operator information of the acquisition part.

(2) Further, in the remote control system according to one aspect of the disclosure, learning data obtained by learning a feature amount of the joint flexion angle of the operator may be stored for each of the gripping methods stored in the gripping method table.

(3) In order to achieve the above, a remote control system according to one aspect of the disclosure is a remote control system in which an operator remotely operates a robot having an end effector that is capable of gripping and manipulating an object. The remote control system includes: an acquisition part acquiring information on a state of the operator operating the robot; an end effector capable of performing multiple types of gripping methods; a gripping method table in which the gripping methods are stored; an intention estimation part estimating an intention of the operator by comparing a distance between a fingertip of a thumb and a fingertip of another finger of the operator with a size of a target object; and a gripping method selector selecting the gripping method from the gripping method table based on the intention of the operator estimated.

According to (1) to (3), the movement of the operator's hand can be reflected.

Hereinafter, an embodiment of the disclosure will be described with reference to the drawings. In the drawings used for the following description, the scale of each member is appropriately changed so that each member has a recognizable size.

In all the drawings for illustrating the embodiment, the same reference numerals are used for the parts having the same functions, and repeated descriptions are omitted.

In addition, "based on XX" in the present application means "based on at least XX," and also includes cases based on other elements in addition to XX. Moreover, "based on XX" is not limited to the case of using XX directly, and also includes cases based on what has been calculated or processed with respect to XX. "XX" is an arbitrary element (for example, arbitrary information).

First Embodiment

FIG. 1 is a diagram for illustrating an overview of a remote control system and an overview of work according to this embodiment. As shown in FIG. 1, an operator Us is wearing, for example, an HMD (head mounted display) 501, controllers 502 (502L, 502R) (data gloves), etc. Environment sensors 300 (300a, 300b) are installed in a work space. The environment sensor 300 may be attached to a robot 1. Further, the robot 1 has hands 5 (5L, 5R). The environment sensor 300 includes, for example, an RBG camera and a depth sensor. The operator Us remotely operates the robot 1 by moving the hand or finger wearing the controller 502 while viewing the image displayed on the HMD 501. In the example of FIG. 1, the operator Us remotely operates the robot 1 to grip a PET bottle obj on a table Tb. In the remote operation, for example, the operator Us cannot directly view the motion of the robot 1, but can indirectly view the image from the robot 1 through the HMD 501.

In this embodiment, a method is constructed to identify the optimum grip for achieving human's long-term intentions by taking gestures performed by a human as direct input.

The shape of the human hand has features depending on what kind of grip is being performed. In this embodiment, these features are used to train an ML model that classifies human intentions into certain gripping class groups. The ML model refers to model artifacts created in a model training process. In this embodiment, for each class in this fixed set, samples of human performing gestures in a realistic way are collected, and a supervised learning algorithm is learned on this data to identify the correct class. The reason for doing this is to maintain human identity by clarifying the number of possible classes, and to naturally create a method for human to select from these classes.

(Configuration of the Remote Control Device)

Next, a configuration example of the remote control device will be described.

Figure 2:
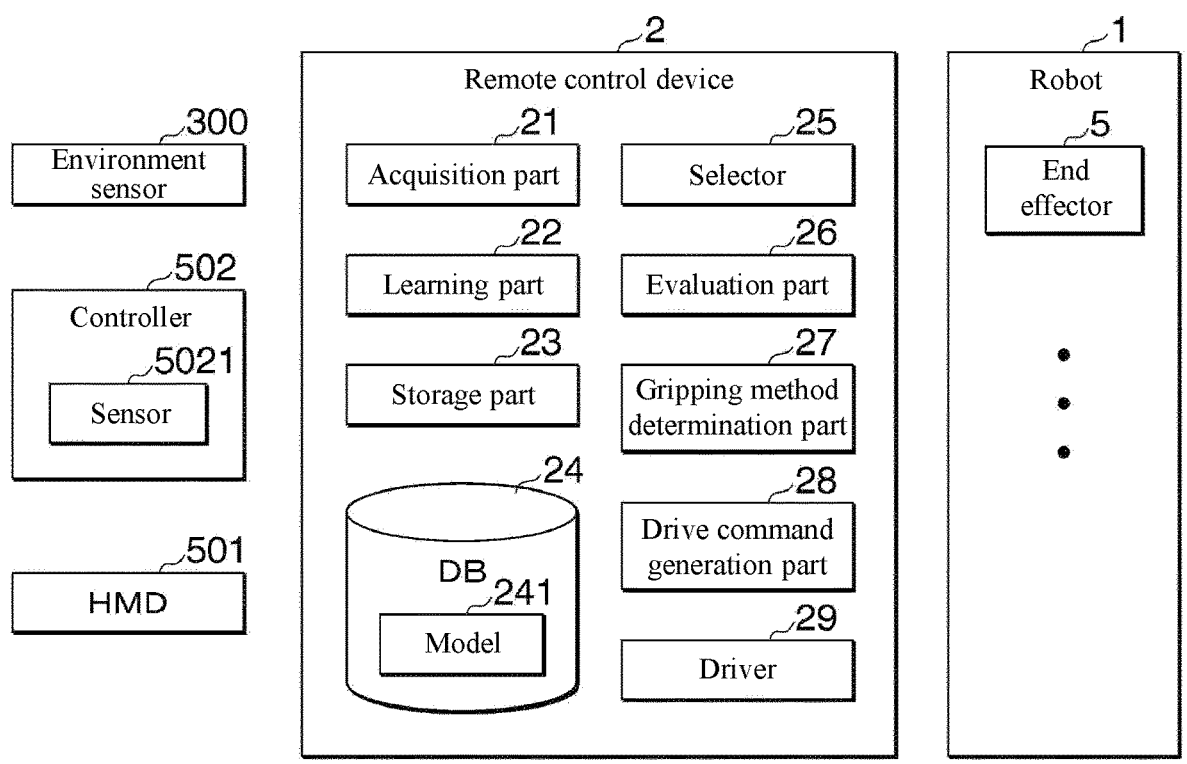
FIG. 2 is a diagram showing a configuration example of the remote control device according to the first embodiment.

FIG. 2 is a diagram showing a configuration example of the remote control device according to this embodiment. As shown in FIG. 2, the remote control system 7 includes, for example, the remote control device 2, an environment sensor 300, an HMD 501, a controller 502, and a robot 1.

The remote control device 2 includes an acquisition part 21, a learning part 22, a storage part 23, a DB 24, a selector 25, an evaluation part 26, a gripping method determination part 27, a drive command generation part 28, and a driver 29.

For example, the environment sensor 300, the controller 502, and the robot 1 are connected to the remote control device 2 in a wired or wireless manner. For example, the HMD 501 may also be connected to the remote control device 2 in a wired or wireless manner.

The controller 502 includes a sensor 5021. The sensor 5021 includes a 6-axis sensor, a gyro sensor, a position sensor, etc. The sensor may also include a force sensor.

The HMD 501 may include a line-of-sight detection sensor that detects a line of sight, for example. The remote control system 7 may not include the HMD 501.

The acquisition part 21 acquires sensor values detected by the sensors from the environment sensor 300, the HMD 501, and the controller 502.

The learning part 22 uses the sensor values acquired by the acquisition part 21 to learn a model 241 and stores or updates the learned model 241 (gripping method table) in the DB 24.

The storage part 23 stores values, threshold values, formulas, programs, etc. necessary for processing.

The DB 24 is a database. The DB 24 stores the model 241. The DB 24 stores information related to gripping and a target object.

The selector 25 detects the shape of the hand based on the acquired sensor values. The selector 25 inputs information indicating the detected shape of the hand to the learned model and selects a class indicating the gripping method.

The evaluation part 26 evaluates the reliability of the selected class.

The gripping method determination part 27 determines the optimum gripping method (class) based on the evaluation result. For example, the gripping method determination part 27 estimates and selects the taxonomy (see Reference Literature 1) of the work that the operator is going to perform by the above processing.

The drive command generation part 28 generates a drive command based on the acquired sensor values (including the position, shape, and size of the target object, the position of the hand, the position of the finger, etc.) and the determined gripping method.

The driver 29 drives the end effector 5 of the robot 1 according to the drive command generated by the drive command generation part 28.

Reference Literature 1; Thomas Feix, Javier Romero, et al., "The GRASP Taxonomy of Human Grasp Types" IEEE Transactions on Human-Machine Systems (Volume: 46, Issue: 1, February 2016), IEEE, p 66-77

(Learning of Model)

Figure 3:
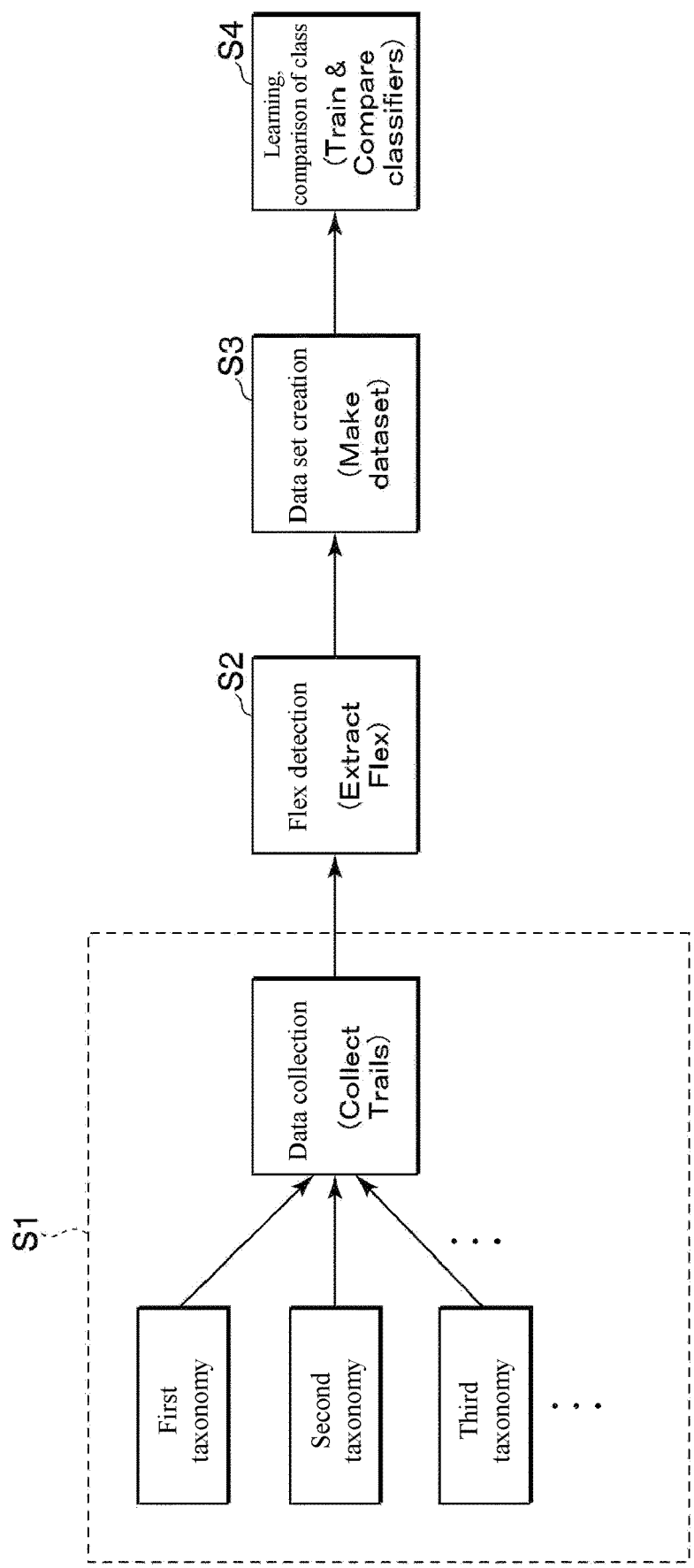
FIG. 3 is a diagram showing an example of the learning process of the model.

FIG. 3 is a diagram showing an example of a learning process of a model.

(Step S1) When creating a model, a worker wears a data glove on his/her hand to collect data used for learning, and performs work for each taxonomy, for example. The work includes, for example, grasping a bottle, pinching the mouth of the bottle, grasping a tape cup from above, etc., while the worker wears the data glove on his/her hand. The learning part 22 acquires data (sensor values of the data glove) during the work performed by the worker in chronological order. The data to be collected may be data for each taxonomy created in advance.

(Step S2) The learning part 22 detects the state of the hand by detecting information on joint flexion angle such as the bending angle of the fingers of the operator based on the sensor values detected by the sensor included in the controller 502. In addition, the learning part 22 may remove unnecessary data from the acquired data according to usage conditions and applications.

(Step S3) The learning part 22 sets information such as the bending angle of the fingers of the operator as a data set.

(Step S4) The learning part 22 learns the model 241 using this data set and teacher data (classes). Thereby, the learning part trains the model 241 to learn correct class identification.

(Online Processing)

Figure 4:
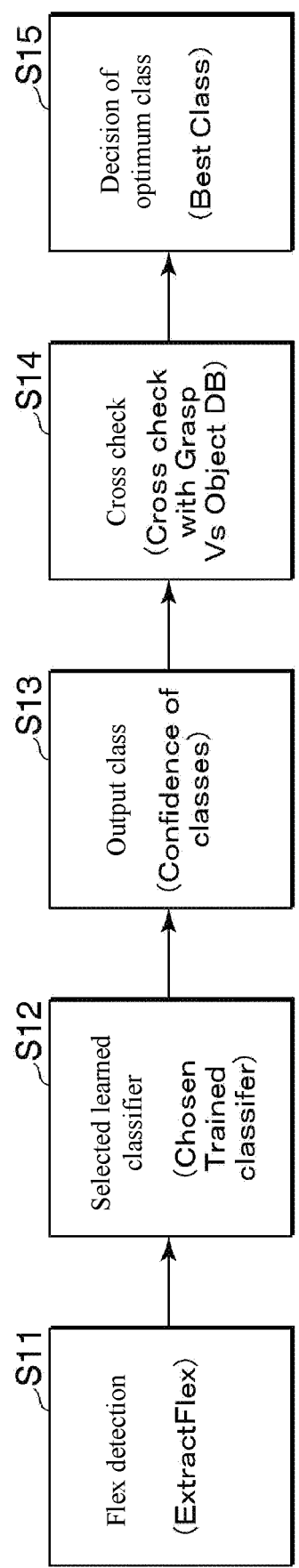
FIG. 4 is a diagram showing an example of the online processing process.

FIG. 4 is a diagram showing an example of an online processing process.

(Step S11) During actual work, the acquisition part 21 acquires the sensor values of the data glove (controller 502). In addition, the acquisition part 21 performs detection, for example, at every predetermined time. For example, the selector 25 detects the state of the hand by detecting information such as the bending angle of the fingers of the operator based on the sensor values detected by the sensor included in the controller 502. The selector 25 may delete any unnecessary data from the acquired data.

(Step S12) The selector 25 estimates the gripping method (class) by using the learned model based on the acquired sensor values and the detection result. For example, the remote control device 2 estimates the gripping method (class) by inputting the bending angle of the fingers of the operator to the learned model 241. In other words, the selector 25 estimates whether it is the taxonomy.

(Step S13) The selector 25 outputs information indicating the estimated class to the gripping method determination part 27.

(Step S14) The gripping method determination part 27 performs cross check by using the DB 24 in which information related to gripping and the target object is stored. In the cross check, the shape of the hand may be estimated by using the sensor values detected by the sensor included in the controller 502, and the estimated shape may be compared with the information stored in the DB 24, so as to evaluate whether the gripping method is appropriate.

(Step S15) The gripping method determination part 27 outputs the optimum class determined by the process of Step S14 to the drive command generation part 28.

Here, the reason why the gripping method and the class of taxonomy can be determined from the shape of the hand will be explained.

Figure 5:
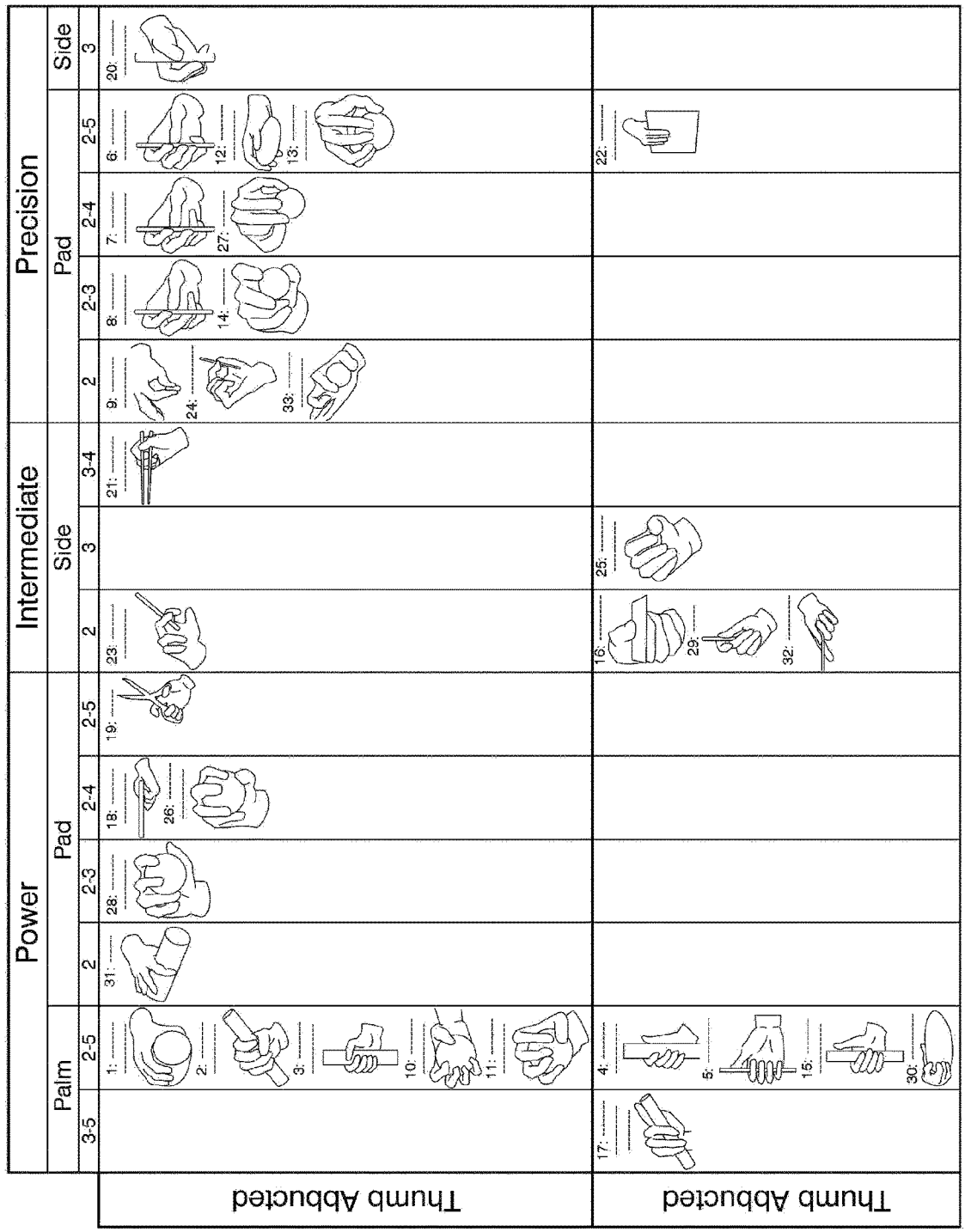
FIG. 5 is a diagram showing an example of the classes of taxonomy.

FIG. 5 is a diagram showing an example of the classes of taxonomy.

As shown in FIG. 5, there are multiple classes of taxonomy. However, as shown in FIG. 5, the shape of the fingers and the shape of the hand differ for each class. Therefore, it is possible to determine which class they belong to based on the shape of the hand such as the angle of the fingers.

As described above, in this embodiment, a model for classifying the class of the target object to be gripped is learned in advance by using the shape of the hand (for example, the angle of the fingers) of the worker based on actual work data and the teacher data. Then, in this embodiment, the gripping method is selected by inputting information indicating the shape of the hand of the worker during work to the learned model.

Thus, according to this embodiment, it is possible to appropriately select the gripping method intended by the operator at the time of operation, so the movement of the hand of the operator can be reflected.

In a case where the robot 1 has two arms, the remote control device 2 trains the model 241 by using the sensor values acquired when the operator works with both hands during learning. Then, during work, the remote control device 2 uses the learned model 241 to determine the gripping method including the work performed with two arms.

The DB 24 and the model 241 may be on the cloud or may be connected via a network.

Second Embodiment

Human intentions can be predicted by using various behavioral cues that human displays while working. One such behavioral cue is a change in the shape of the human hand based on the anticipation of grasping a particular object for a particular purpose.

Modern systems prefer to collect a huge amount of data and train a deep learning model. Such systems are not explicitly taught to look at the shape of the human hand mathematically. In addition, there is a tendency to ignore the shape of the human hand because it is difficult to capture the shape of the human hand in an image taken with a camera due to many naturally occurring occlusions.

Therefore, in this embodiment, the shape of the hand of the operator is detected by using the sensor values provided in the controller 502. In addition, in this embodiment, human gripping data is mathematically modeled. Further, in this embodiment, a wearable finger motion detection device (for example, a data glove (controller 502)) including a sensor is used as in the first embodiment.

(Configuration of the Remote Control Device)

Figure 6:
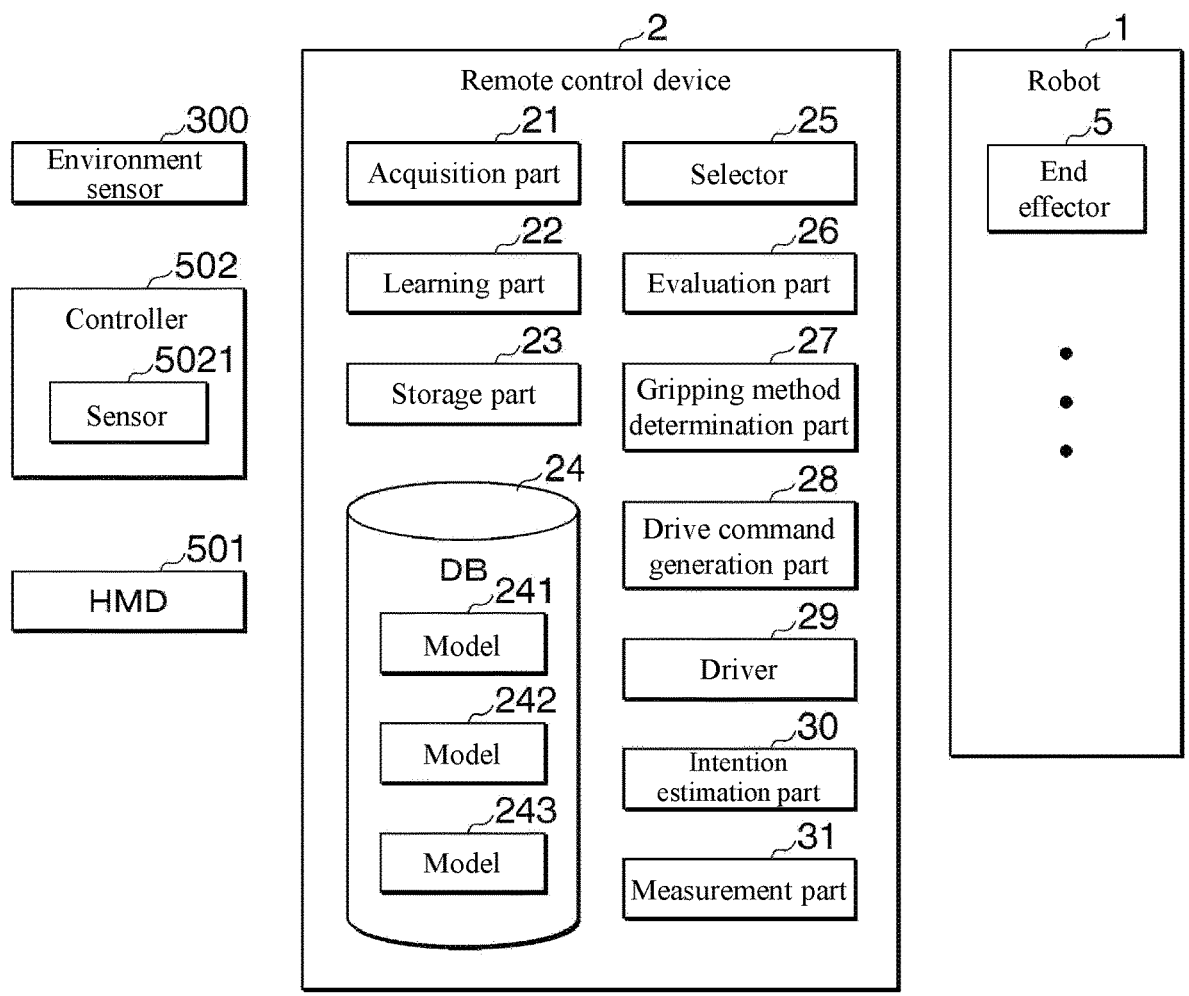
FIG. 6 is a diagram showing a configuration example of the remote control device according to the second embodiment.

Next, a configuration example of the remote control device will be described. FIG. 6 is a diagram showing a configuration example of the remote control device according to this embodiment.

As shown in FIG. 6, a remote control system 7A includes, for example, a remote control device 2A, an environment sensor 300, an HMD 501, a controller 502, and a robot 1. The remote control system 7A may not include the HMD 501.

The remote control device 2A includes an acquisition part 21, a learning part 22, a storage part 23, a DB 24A, a selector 25, an evaluation part 26, a gripping method determination part 27, a drive command generation part 28, a driver 29, an intention estimation part 30, and a measurement part 31.

Further, the DB 24A includes a model 241, a model 242, and a model 243.

For example, the environment sensor 300, the controller 502, and the robot 1 are connected to the remote control device 2A in a wired or wireless manner. For example, the HMD 501 may also be connected to the remote control device 2A in a wired or wireless manner.

The intention estimation part 30 estimates an intention of the operator by using the model 242 that is capable of outputting a successful gripping pose for a given target object. The intention estimation part 30 estimates the intention of the operator by using the result measured by the measurement part 31. The intention estimation part 30 estimates the intention of the operator by using the learned model 243.

The measurement part 31 measures, for example, the distance between the thumb and other fingers based on the sensor values detected by the sensor included in the data glove (controller 502). In addition, the measurement part 31 obtains the shape, size, and position of the target object based on the position information at each feature point of the target object included in the sensor values detected by the environment sensor 300.

(Processing Content)

In this embodiment, the following three methods are used to model the data collected by the controller 502 and the environment sensor 300 to estimate the intention of the operator.

1. First method; back-computation-based method

The intention of the operator is estimated by using a model ((model 242) reference graspit: https://graspit-simulator.github.io/) that is capable of outputting the successful gripping pose for a given object.

2. Second method; geometric method

Human always grips an object with the thumb, so the distance between the thumb and other fingers and the size of the object are compared to calculate the intention.

3. Third method; method using deep learning

A deep learning model (model 243) for predicting the intention is created by creating a data set when the operator wears the data glove (controller 502) and successfully grasps the target object, and this model is used to estimate the intention.

Thus, in this embodiment, by effectively modeling the information of human fingers, it is possible to improve the efficiency of all other human intention prediction models that could not take this information into account. Thus, according to this embodiment, it is possible to accurately estimate the work intention of the operator, that is, which target object the operator intends to touch.

(Geometric Method)

Here, the geometric method, which is the second method, will be described.

Figure 7:
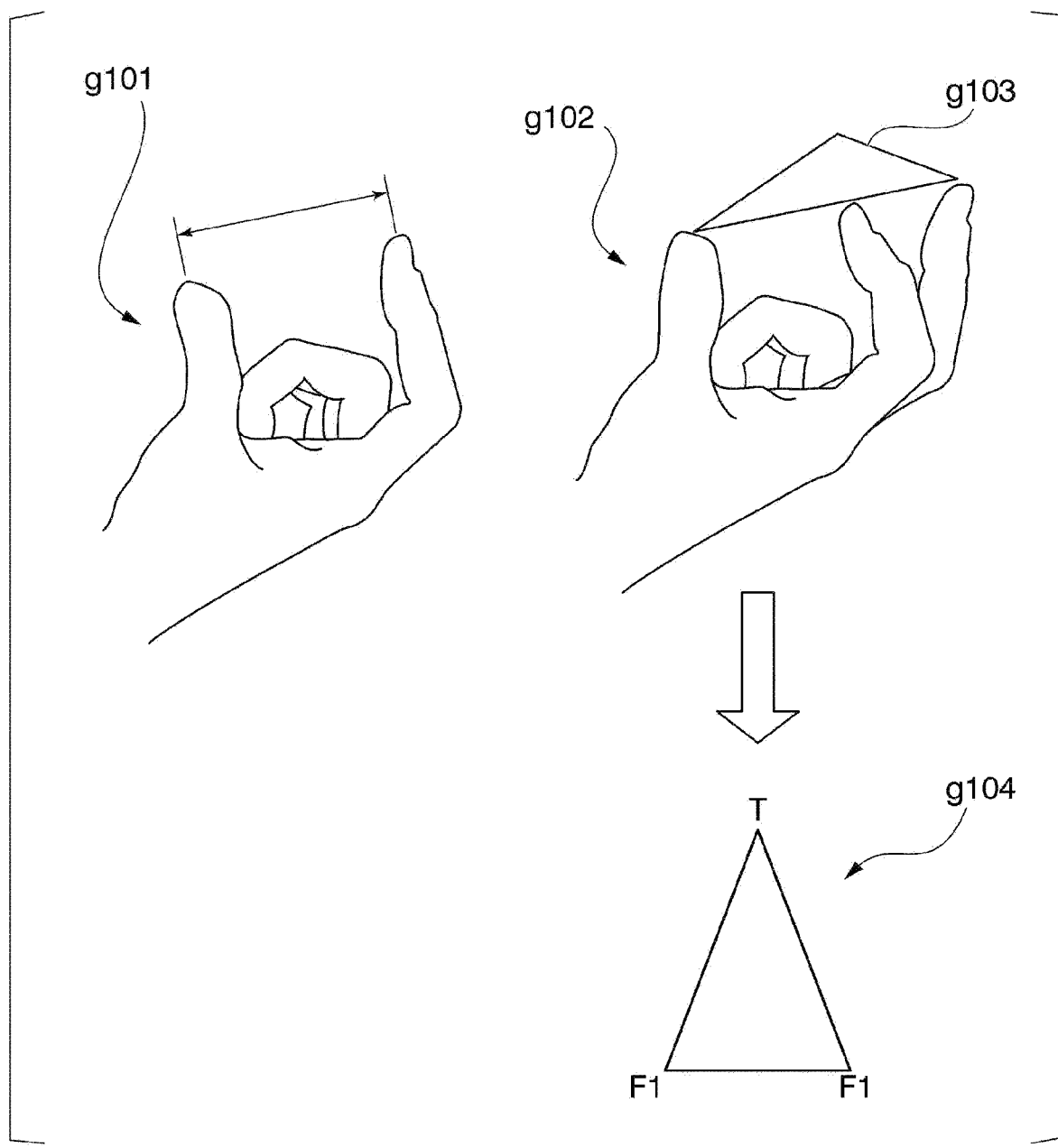
FIG. 7 is a diagram for illustrating a geometric method which is the second method according to the second embodiment.

FIG. 7 is a diagram for illustrating the geometric method, which is the second method according to this embodiment. The model in FIG. 7 represents the worker's fingers.

The image g101 represents the distance between two fingers (for example, the thumb and index finger) during gripping.

The image g102 represents a case of three fingers (for example, the thumb, index finger, and middle finger) during gripping. Thus, when gripping with three fingers, the space created by the three fingers can be represented by a triangle g103. Like the triangle g104, this triangle g103 can be approximated by having the base at the position F1 of the first finger and the position F2 of the second finger and the vertex at the position T of the third finger.

In the second method, by measuring the distance between the fingers modeled in this way and comparing it with the size of the target object candidate, it is possible to determine whether the target object candidate is the object that the operator is trying to grasp. For example, if the spacing between the fingers is narrower than the size of the target object candidate, it can be estimated that the object is not the intended object. Alternatively, if the spacing between the fingers is wider than the size of the target object candidate, it can be estimated that the object is the intended object.

In this embodiment, human gripping data is mathematically modeled. In this embodiment, a wearable finger motion detection device is used instead of an imaging device.

As described above, according to this embodiment, by effectively modeling human finger information, it is possible to improve the efficiency of all other human intention prediction models that could not take this information into account.

A program for realizing some or all of the functions of the remote control device 2 (or 2A) in the disclosure may be recorded in a computer-readable recording medium, and a computer system may be caused to read and execute the program recorded in this recording medium to perform all or part of the processing performed by the remote control device 2 (or 2A). The "computer system" referred to here includes hardware such as an OS and peripheral devices. Further, the "computer system" also includes a WWW system provided with a home page providing environment (or display environment). In addition, the "computer-readable recording medium" refers to a portable medium such as a flexible disk, a magneto-optical disk, a ROM, and a CD-ROM, and a storage device such as a hard disk built into the computer system. Furthermore, the "computer-readable recording medium" also includes a medium that holds the program for a certain period of time, like a volatile memory (RAM) inside the computer system that acts as a server or client when the program is transmitted via a network such as the Internet or a communication circuit such as a telephone circuit.

In addition, the above program may be transmitted from the computer system that stores this program in the storage device or the like to another computer system via a transmission medium or by transmission waves in a transmission medium. Here, the "transmission medium" for transmitting the program refers to a medium having a function of transmitting information, like a network (communication network) such as the Internet or a communication circuit (communication line) such as a telephone circuit. Further, the above program may be for realizing some of the functions described above. Furthermore, it may be a so-called difference file (difference program) that can realize the above-described functions in combination with a program already recorded in the computer system.

Although the mode for implementing the disclosure has been described above using the embodiment, the disclosure is by no means limited to such an embodiment, and various modifications and replacements can be made without departing from the gist of the disclosure.

What is claimed is:

1. A remote control system in which an operator remotely operates a robot having an end effector that is capable of gripping and manipulating a target object, the remote control system comprising:
   an end effector capable of performing multiple types of gripping methods;
   a controller, to operate the end effector, the controller comprising a sensor;
   a data base, comprising a memory storing a gripping method table;
   a processor configured to function as:
   an acquisition part acquiring information on a state of the operator operating the robot;
   a gripping method selector selecting the gripping method from the gripping method table based on a joint flexion angle of the operator obtained from operator information of the acquisition part;
   a drive command generation part generating a drive command based on the selected gripping method;
   an intention estimation part estimating an intention of the operator by comparing a distance between a fingertip of a thumb and a fingertip of another finger of the operator with a size of the target object, wherein the intention estimation part determines that the target object is not an intended object that the operator is trying to grasp when the distance between the fingers is narrower than the size of the target object, and the intention estimation part determines that the target object is the intended object that the operator is trying to grasp when the distance between the fingers is wider than the size of the target object;

wherein the end effector is driven according to the drive command, wherein the gripping methods of the gripping method table are classified by a plurality of classes of taxonomy, wherein learning data obtained by learning a feature amount of the joint flexion angle of the operator is stored for each of the gripping methods stored in the gripping method table, wherein the processor is further configured to function as a gripping method determination part that performs a cross check by using the data base in which information related to gripping and the target object is stored, in the cross check, a shape of a hand of the operator is estimated by using sensor values detected by the sensor included in the controller, and an estimated shape of the hand is compared with the gripping method table classified by the plurality of classes of taxonomy, so as to evaluate whether the selected gripping method is appropriate.

2. A remote control system in which an operator remotely operates a robot having an end effector that is capable of gripping and manipulating an object, the remote control system comprising:

an end effector capable of performing multiple types of gripping methods;

an environment sensor, detecting a size of a target object;

a memory, storing a gripping method table;

a processor configured to function as:

an acquisition part acquiring information on a state of the operator operating the robot;

an intention estimation part estimating an intention of the operator by comparing a distance between a fingertip of a thumb and a fingertip of another finger of the operator with a size of the target object, wherein the intention estimation part determines that the target object is not an intended object that the operator is trying to grasp when the distance between the fingers is narrower than the size of the target object, and the intention estimation part determines that the target object is the intended object that the operator is trying to grasp when the distance between the fingers is wider than the size of the target object; and a gripping method selector selecting the gripping method from the gripping method table based on the intention of the operator estimated;

a drive command generation part generating a drive command based on the selected gripping method;

wherein the end effector is driven according to the drive command.

\* \* \* \* \*